(12) United States Patent
Glaesener et al.

(10) Patent No.: US 7,497,678 B2
(45) Date of Patent: Mar. 3, 2009

(54) CLAMP PISTON ASSEMBLY WITH MOLD BREAK FUNCTION

(75) Inventors: Pierre Glaesener, Bissen (LU); Christophe Halter, Selange (BE); Joaquim Martins Nogueira, Everett (CA)

(73) Assignee: Husky Injection Molding Systems Ltd, Bulton ON (CA)

( * ) Notice: Subject to any disclaimer, the term of this patent is extended or adjusted under 35 U.S.C. 154(b) by 0 days.

(21) Appl. No.: 11/773,530

(22) Filed: Jul. 5, 2007

(65) Prior Publication Data

US 2009/0011072 A1 Jan. 8, 2009

(51) Int. Cl.
*B29C 45/64* (2006.01)
(52) U.S. Cl. ............... 425/190; 425/451.9; 425/595
(58) Field of Classification Search ......... 425/190, 425/595, 451.9
See application file for complete search history.

(56) References Cited

U.S. PATENT DOCUMENTS

| | | | |
|---|---|---|---|
| 2,976,569 A | 3/1961 | Quere et al. | |
| 3,579,740 A | 5/1971 | Rees | |
| 4,704,078 A | 11/1987 | Hehl | |
| 4,874,309 A * | 10/1989 | Kushibe et al. | 425/595 |
| 5,868,989 A * | 2/1999 | Glaesener et al. | 425/595 |
| 6,250,905 B1 * | 6/2001 | Mailliet et al. | 425/595 |
| 6,719,553 B1 | 4/2004 | Hehl | |
| 2007/0296119 A1 | 12/2007 | Kestle et al. | |

FOREIGN PATENT DOCUMENTS

| | | |
|---|---|---|
| CA | 1037666 A | 9/1978 |
| CA | 2146101 A1 | 10/1995 |
| EP | 0904918 A | 3/1999 |
| GB | 2064415 A | 6/1981 |

OTHER PUBLICATIONS

Search Report 3 Pages, dated Oct. 3, 2008.

* cited by examiner

*Primary Examiner*—James Mackey

(57) ABSTRACT

A self-positioning clamp piston assembly (300) provides clamp-up, mold break and position reset function through the provision of distinct clamp-up (329), mold break (366) and reset (368) chambers. A position reference shoulder (337) on a piston front ring (330) fixed into a platen (12), permits positioning of a tie bar (12) to ensure clearance (102) between teeth (100) on the tie bar (12) and teeth (98) on a related but separate locking assembly (94). With the tie bar (12) coupled to a clamp piston (304) through a tie bar end plate (340), movement of the tie bar under clamp pressure displaces an independently moveable reset piston (360) from alignment with the tie bar end plate (340). Pressurization of the mold break chamber (366) causes displacement of the reset piston (360) from the shoulder (337), but re-alignment of the reset piston with the tie bar end plate (340). Finally, actuation of the reset piston (260) through pressurization of the reset chamber (368) restricts movement of the clamp piston (304) but permits the reset piston (360) to be moved back against the shoulder (337) to establish the clearance (102).

18 Claims, 8 Drawing Sheets

Rest/Neutral

Clamp-up

Mold Break

CLAMP PISTON ASSEMBLY WITH MOLD BREAK FUNCTION

FIELD OF THE INVENTION

This invention relates, in general, to a clamp piston assembly with a mold break function and is particularly, but not exclusively, applicable to presses and the like in which clamp force and mold break are undertaken by hydraulic piston assemblies.

SUMMARY OF THE PRIOR ART

From the exemplary perspective of an injection molding environment, system designers are faced with having to provide reliable and robust clamping systems that operate for extended periods with minimum, if any, maintenance. Indeed, clamp units and clamp assemblies in injection molding systems are designed to run on an almost continuous basis for weeks, if not months, on a machine cycle that may vary from a few seconds to a couple of minutes (depending upon part weight). In certain applications, clamp-up speed may therefore be an important consideration because these lock and clamp times may represent a sizeable fraction of the overall cycle.

In the injection molding of large articles, such as in the molding of car body parts and the like, the injection molding machines develop considerable closure tonnage. Indeed, it is not unusual for machines in large tonnage applications to range from about 1000 to 5000 tons of clamp force, with very large machines capable of generating clamp tonnages in the region of about 8000 tons. Even with smaller applications, such as in the production of PET preforms, machines typically must develop something in the range of between 300 and 600 tons of closure pressure. In view of the forces involved, particularly in large tonnage applications above about 800 tons, the physical scale of machine components and their construction is both large and robust, respectively. With a typical clamp assembly made from steel, its weight alone can be in the region of about 500 to 1000 kilograms. Conventionally, such a clamp assembly (including its associated actuation pistons) is fixedly attached to the moving platen (for example) and therefore contributes to issues surrounding its movement and particularly the acceleration and deceleration of large masses.

In terms of achieving clamping of the tie bar into the platen (i.e. through positive engagement of the tie bar or column into the clamp piston), one realisation requires each tie bar or column to include at least one integrally formed annulus of protruding teeth extending outwardly from the surface of the tie bar or column. There may be more than one annulus of teeth. This tie bar locking and clamping arrangement is described, for example, in EP-A-0904918. Specifically, to allow relative longitudinal movement of the tie bar with respect base of the injection unit, each annulus includes at least one channel that is transverse to and disrupts the circumferential continuity of the teeth. Within the clamp piston itself, a second set of teeth (on an inner surface of the piston) is arranged to be selectively inter-locking with the corresponding teeth in the tie bar, with the clamp piston therefore dimensioned to closely surround the tie bar. Again, the circumferential continuity of the rows of teeth in the internal surface is disrupted by at least one channel. Longitudinal alignment of the teeth in the clamp piston with the channel through the teeth of the tie bar (or column) thereby permits axial movement of the tie bar relative to the clamp piston. Conversely, matched alignment and inter-locking of the respective sets of teeth in both the tie bar and clamp piston establishes positive engagement and the subsequent ability to develop clamp force through the application of hydraulic force on piston surfaces within the clamp assembly. This locking and clamping configuration is sometimes referred to as a "pineapple" clamp.

To achieve longitudinal positioning of the tie bar relative to the piston, valve-controlled hydraulic circuits accurately locate each piston based on position measurements of the piston within the moving platen. More particularly, since each tie bar moves relative to its associated clamp assembly, position determination is important to ensure that clearance, as appropriate, is achieved between the respective sets of teeth on the piston and tie bar. Typically, temposonic transducers (TSTs) are used to assess the moving platen position. TSTs are expensive, while positioning based on pressure control and TST measurements is neither particularly simple nor inexpensive.

Not only is the mass of the clamp piston assembly both detrimental to achieving low-cost and controlled movement and speed of operation, but rotation of the relatively heavy clamp assembly requires a suitably robust and synchronized actuation mechanism. In known systems, such as described in EP-A-0904918, exterior surfaces of the clamp pistons are mechanically coupled together through a network of connecting rods. A piston cylinder, within the network of connecting rods, is actuated to cause lateral movement of the rod. This lateral movement is then translated into rotational movement of the clamp piston by virtue of the fact that the centre of rotation of the clamp piston is concentric with the major axis of each corresponding tie bar. In relation to the periodic rotation of the entire clamp piston, the moment of inertia and, fundamentally, the weight of the clamp piston assembly requires equally robust, physically sizeable and relatively costly drive mechanisms. Consequently, considerable energy and cost is expended in rotating the entire clamp piston, which energy consumption has an impact on manufacturing cost overheads. In fact, from a manufacturing perspective, the cost for producing a unitary clamp piston is not inexpensive, especially when one considers the inherent complexity and highly-toleranced nature of a relatively large component.

In today's systems, hydraulic cylinders are often used to rotate the entire clamp piston. However, with high pressure rise rates in these cylinders, such prior art systems are susceptible to high amounts of hydraulic shock. Furthermore, there is an associated high level of noise and a high loading of individual components. And the locking cylinder force in these prior art systems must be relatively high to overcome the clamp seal force and high moment of inertia of the piston.

Further problems exist with the opening of the mold for the removal of molded parts. Specifically, at "mold break" (where the mold halves are separated), resistance to mold break occurs as a consequence of three effects, namely:

i) part geometry (e.g. an undercut in part designed and especially when the molded parts are relatively deep);

ii) vacuum induced in the mold cavity through: i) evacuation of air from the mold during mold opening; and/or ii) shrinkage of the molded part away from the cavity's walls; and/or iii) mold flash. Mold flash occurs when plastic leaks along the mold split line, with flash arising through over-injection of material or poor platen parallelism. Flash is particularly troublesome because it can cause direct wear to mold components. Moreover, flashing of the mold (which frequently occurs during start-up procedures) can result in the keying of solidified plastic into screw heads and recesses of the mold, with mold break achieved through forcible opening of the mold with levers.

Systems are therefore generally designed to provide some assistance in mold break.

In a molding machine, stroke cylinders primarily function to move the platens together and away from one another. Stroke cylinders are often located on the sides of machine platens to permit the mounting and use of top entry robots. To ensure symmetrical operation of the platens, the molding machine will generally operate with at least one pair of stroke cylinders, with the pair being diagonally displaced across the platen. Stroke cylinders are not, however, used for the generation of clamp tonnage and, consequently, stroke cylinders should generally be dimensioned and designed to effect only movement of the mass of the moving platen(s). Some systems further use such stroke cylinders to effect mold break, although the resistive forces can be significant enough to cause eventual buckling of piston rods of these stroke cylinders. To overcome potential bucking problems, existing design philosophy is to strengthen and over-size the stroke cylinders to compensate for additional mechanical stresses/strains. However, larger and heavier stroke cylinders are more expensive both in terms of absolute costs and overall machine running costs. Furthermore, larger stroke cylinders necessarily use more oil and hence cause lower energy efficiency.

Alternatively, mold break has been effected using the clamp cylinder and associated piston; again this in described in EP-A-0904918. More specifically, the rotating clamp cylinder piston is configured as a two-way translational piston that can be selectively driven by controlled oil entry into and venting from opposing oil chambers generally defined between the piston and platen. As will be appreciated, mold break force is relatively small compared to the clamp force. With mold break, the applied force developed by the piston relative to the moving platen is in a direction outward from the mold. Consequently, a resultant reaction force is in the opposite direction, which reaction force runs through the tie bar. With the tie bar coupled to the stationary platen via a retaining (end) plate, the entire reaction force is seen across the retaining plate. Therefore, by necessity, prior art retaining plates are heavy and large steel plates that are securely attached, e.g. bolted, against the stationary platen.

In order to define and seal the oil chambers between surfaces, multiple oil seals are used around the circumferences of the rotating piston. These seals are wear items that may fail and thus require at least periodic assessment and, ultimately, replacement. Moreover, seals are expensive because of both their physical size (that corresponds to the diameter of the clamp piston) and their composition (that must reduce frictional wear, high pressures and oil contact). In terms of the seals used within a clamp piston assembly, these fall generally within three types: i) standard O-rings; ii) recessed standard O-rings with a supporting back-up or cradle, where the back-up cradle prevents distortion of the O-ring in instances of relative longitudinal surface movement; and iii) high pressure seals that are realised by an O-ring mounted in a stepped support cradle. All such seals are made of a durable, chemically insert and resistive material. In relation to seal cross-sectional geometries, these may be symmetrical to give substantially uniform sealing from both sides of the seal and irrespective of any direction of movement relative to the seal itself. High pressure seals, such as the GlydRing® seal and Stepseals® manufactured by Busak & Shamban, may also have support cradles that contain pointed contact regions that enhance contact pressure at sealing lips (of those pointed regions) to promote better sealing. In such high pressure seals, the sealing lip prevents oil film passage.

With any components that experience both rotation and translation movement, seals are continuously worked in all axis. Seals associated with rotating clamp piston assemblies experience relative longitudinal displacement (from the tie bars sliding movement) and also rotational translation between the tie bar and clamp piston. More particularly, the application of rotational and axial forces to the tie bars requires the generation of a significant amount of torque to overcome the friction resisting rotation caused by such hydraulic seals in the clamp piston. Consequently, seal deformation and premature wear may result. Additionally, with a rotating and axially translational piston, the axial movement of the piston, in practical terms, means that the sealing surfaces are periodically exposed to the air. If such a seal fails, then oil may leak outwards from the platen and collects on the outer surface of the platen; this is clearly messy and environmentally polluting.

U.S. Pat. No. 2,976,569 describes a clamp piston that performs both clamp up and mold break functions. With rotation of the piston to engage and disengage teeth at the end of the tie bar, seal wear failure is a prevalent problem.

GB-A-2,064,415 describes a system that utilises a rotating clamp piston to effect tie bar clamp up. Additionally, a separate opening cylinder, collocated with the clamp piston, is arranged to act on the end surface of the tie bar to develop a mold break force. Essentially, the piston of the opening cylinder simply pushes on a disengaged (i.e. non-locked) end of the tie bar to cause the moving platen to be forced away from the stationary platen.

In separating out the functions associated with locking and clamp force generation, the Applicant has previously proposed that the rotational locking assembly be directly incorporated into the moving platen while the clamp force be moved to an assembly located within the stationary platen. At this time (June 2007), such a configuration has been detailed in patent applications that have yet to be made available to the public (namely U.S. patent application Ser. No. 11/451,928 filed on 13 Jun. 2006), with the consequence that these patent applications may have limited prior art effect, i.e. they may in the future be relevant to novelty considerations only should they eventually publish. In U.S. patent application Ser. No. 11/451,928, the moving platen comprises a bore into which is fixed a threaded bushing. Threads on the bushing engage into a rotating locking sleeve that itself has an internally notched surface arranged positively to engage corresponding shaped teeth in an external surface of a tie bar passing through the sleeve. By spinning the rotating locking sleeve along the threads of the bushing, the position of the sleeve relative to the moving platen can be adjusted. The positionable nature of the sleeve therefore permits the system to accommodate molds having varying shot-heights. Once located in position with the moving platen, rotation of the locking sleeve is restricted to effect engagement or disengagement of the respective teeth on the tie bar, thereby acting to lock or free the tie bar into/from the moving platen.

To effect clamp force generation, U.S. patent application Ser. No. 11/451,928 also describes a clamp piston that is solely axially (in the sense of translationally) movable relative to a tie bar end plate and piston front plate. Clamp tonnage is developed through the use of hydraulic fluid selectively pumped into an oil chamber defined between an inner edge of the clamp piston and a bore in the stationary platen in which the clamp piston is located. The piston has a threaded inner surface that engages into a corresponding thread in the end of the tie bar to relay force therebetween. The introduction of hydraulic fluid into the oil chamber forces the overall piston assembly against the piston front plate, while a spring constantly urges the piston away from the tie bar end plate. The net effect is that, provided the force created in the oil chamber is always less than the force generated by the spring, the tie bar and piston assembly are held in place, as necessary, to allow locking (via rotation of the locking sleeve) without interference. This particular configuration does not, however, support a mold break function, although it clearly benefits from a simplified design and is an improvement over other commercially available designs. Consequently, in U.S. patent application Ser. No. 11/451,928, stroke cylinders are contemplated as the mechanism used to effect mold break.

SUMMARY OF THE INVENTION

According to a first aspect of the invention there is provided a self-positioning clamp assembly comprising: a clamp up chamber arranged to effect, in use, movement of a clamp piston in a first axial direction; a mold break chamber arranged to effect movement of the clamp piston in a second axial direction opposite to the first axial direction; and a position reset chamber in which a reset piston is operative and independently moveable from the clamp piston; a first reference shoulder against which the reset piston is selectively both engageable and separable; and a second reference shoulder moveable relative to the first reference shoulder and against which second shoulder the reset piston is selectively both engageable and separable; wherein an axial reference position for the clamp assembly occurs with simultaneous engagement of the reset piston against both the first reference shoulder and the second reference shoulder.

In another aspect of the present invention there is provided a platen having a plurality of bores in each of which is located a self-positioning clamp assembly comprising: a clamp up chamber arranged to effect, in use, movement of a clamp piston in a first axial direction; a mold break chamber arranged to effect movement of the clamp piston in a second axial direction opposite to the first axial direction; a position reset chamber in which a reset piston is operative and independently moveable from the clamp piston; a first reference shoulder against which the reset piston is selectively both engageable and separable; and a second reference shoulder moveable relative to the first reference shoulder against which the reset piston is selectively both engageable and separable; wherein an axial reference position for the clamp assembly occurs with simultaneous engagement of the reset piston against both the first reference shoulder and the second reference shoulder.

In a further aspect of the present invention there is provided a method of establishing an axial reference position for a tie bar in a clamp assembly having: a clamp up chamber in which a clamp piston is operative; a mold break chamber; a position reset chamber in which a reset piston is operative and independently moveable from the clamp piston; a first reference shoulder against which the reset piston is selectively both engageable and separable; and a second reference shoulder moveable relative to the first reference shoulder and against which second reference shoulder the reset piston is selectively both engageable and separable; the method comprising: for a limited time, generating sufficient force in the clamp up chamber to move the clamp piston in a first axial direction to disengage the reset piston from the second shoulder and to effect clamp up; for a limited time, generating sufficient force in the mold break chamber to move the clamp piston in a second axial direction opposite to the first axial direction to cause engagement of the reset piston against the second shoulder and to cause disengagement of the reset piston from the first reference shoulder; and thereafter for a limited time, generating force both in: i) the clamp up chamber to move the clamp piston in the first axial direction; and ii) the reset chamber to restrict axial displacement of the clamp piston in first direction, thereby to cause simultaneous engagement of the reset piston against both the first reference shoulder and the second reference shoulder to establish the axial reference position.

Advantageously, by providing a piston mold break function in the non-rotating clamp piston, a system employing the present invention does not need to rely on stroke cylinders to initiate mold break. This has the effect that the size of the stroke cylinders can be reduced and, relatedly, that the oil volume and flow can be reduced. In reducing oil flow, smaller and cheaper pumps, valves and hoses mean that the system benefits from lower energy consumption and overall cheaper cost. Additionally, the piston assembly of the present invention is capable of generating higher reset forces, i.e. larger mold break forces, achievable by suitable scaling of oil chambers.

The present invention therefore provides a self-positioning clamp piston assembly that includes a mold break function. A hard reference point for a tie bar position is provided to ensure clearance between teeth in a related locking assembly that is distanced from the clamp piston assembly. The hard reference point is achieved in response to actuation of hydraulic or pneumatic pressure within a reset chamber that drives the clamp piston back against the reference point, while the uncertainty in the tie bar position is initially created by movement of the tie bar arising from pressure applied to a mold break chamber.

BRIEF DESCRIPTION OF THE DRAWINGS

Exemplary embodiments of the present invention will now be described with reference to the accompanying drawings, in which.

DETAILED DESCRIPTION OF A PREFERRED EMBODIMENT

Figure 1:
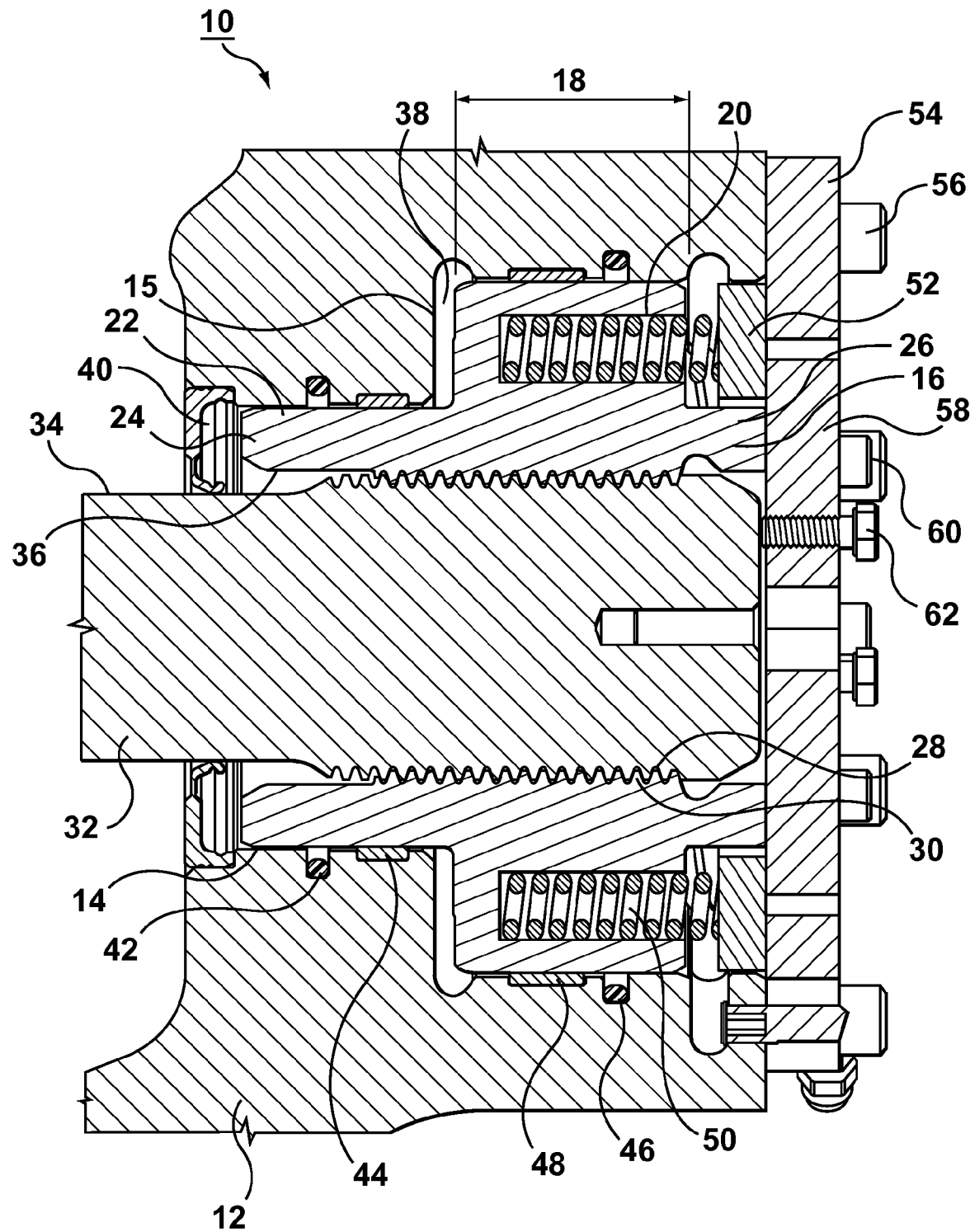
FIG. 1 is a proposal for a tie bar clamping system in which clamp-up and lock functions have been separated.

Referring to FIG. 1, a detailed view of a tie bar clamping system 10 is shown. More particularly, FIG. 1 conforms to the concepts expounded in U.S. patent application Ser. No. 11/451,928 where clamp-up and lock functions have been respectively separated between the stationary and moving platens of an injection molding machine (not shown).

A platen 12 includes a bore 14 into which is located a generally cylindrical clamp piston 16. Typically, the platen that retains the clamp assembly will be the stationary platen, although this need not be the case. The bore 14 includes a step 15 that varies the diameter of the bore 14 from a relatively wide diameter to a relatively small diameter. The clamp piston 16 includes a relatively wide (i.e. thick) clamp piston head 18 that includes a plurality of holes 20 around its circumference. The clamp piston further includes an elongate body portion 22 integrally formed with the clamp piston head 18, the body portion 22 having longitudinally extending legs 24, 26 extending forward and aft of the clamp piston head 18. On an inner surface 36 of the body portion 22, a keyed (or preferably threaded) area 28 is arranged to positively engage into a corresponding keyed (or preferably threaded) surface 30 of a tie bar 32, whereby a resulting coupling of the tie bar 32 to the piston 16 permits force transmission therebetween. The inner surface 36 of the body portion 22 (and particularly inner leg 24 and outer leg 26) of the piston therefore extends along and are juxtaposed to an outer surface 34 of the tie bar 32 to generally surround an end region of the tie bar 32.

The clamp piston head 18 locates within the relatively wide diameter of the bore 14 to define, in combination with an outer surface of the inner leg 24 and the step 15, a clamp up chamber 38 for receipt, in use, of hydraulic fluid, such as oil. The inner leg 24 extends into the relatively small diameter of the bore 14 such that the end of the inner leg 24 abuts and seals into a retainer 40. Between an external surface of the inner leg 24 and the relatively narrow region of the bore 14, pressure seals 42 and wear rings 44 may be located to provide sealing and to accommodate sliding movement of the clamp piston 16 relative to the (stationary) platen 12. Similarly, pressure seals 46 and wear rings 48 are typically included between an outer surface of the clamp piston head 18 and the relatively wide region/diameter of the bore 14.

The multiple holes 20 extend into the clamp piston head 18 in a direction parallel to the legs and accommodates a first end of a spring 50. An outer end of spring 50 abuts against a reset stop plate 52 that is itself located within the bore 14. The reset stop plate 52 abuts against a retaining (piston front) plate 54 that is coupled (typically with a bolt 56 or the like) to the stationary platen 12. The retaining plate 54 holds the piston assembly in place. The reset stop plate 52 also abuts against a piston end plate 58 that is coupled (typically with a bolt 60 or the like) to the piston 16. Generally, locking screws 62 separate the piston end plate 58 from the tie bar 32. Consequently, the piston, the piston end plate 58 and tie bar 32 move as one sub-assembly, with the spring 50 functioning to provide a self-setting reset position for the piston in circumstances where there is minimal residual pressure in the clamp up chamber 38. Under clamp up pressure, the reset stop plate 52 is forced against the retaining (piston front) plate 54, the springs 50 are further compressed and the piston end plate 58 lifts off from the reset stop plate 52.

To avoid overly complicating FIG. 1, hydraulic supply and drain channels (as well as associated valving) and accumulators have been omitted. It will, however, be clearly appreciated by the skilled addressee that channelling must be provided to the clamp up chamber 38 and that such channelling will be through the substance of the stationary platen 12 to, typically, an accumulator or pump capable of selectively supporting the generation of appropriate hydraulic pressures.

Figure 2:
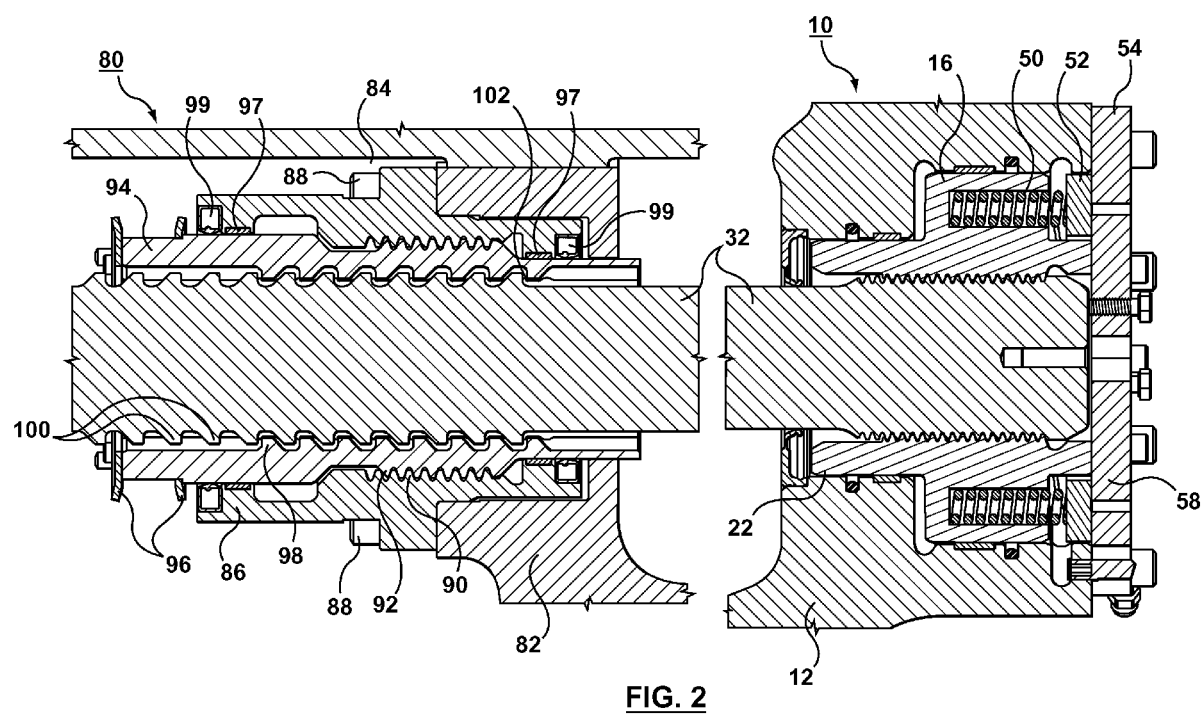
FIG. 2 shows the relationship between the tie bar clamping system of FIG. 1 and a separate locking unit.

Turning to FIG. 2, the complementary locking mechanism to the tie bar clamping system 10 of FIG. 1 is shown. The locking mechanism 80 generates no clamp force, but simply rotates to engage/lock and disengage the tie bar 32. A moving platen 82 comprises a bore 84 into which is fixed a bushing 86. Fixing may be through any conventional means, such as bolts 88. Threads 90 on an internal surface of the bushing 86 engage into corresponding threads 92 on an exterior surface of a rotating locking sleeve 94. Alternatively, the threads could be directly inside the bores of the moving platen, thus eliminating the need for a bushing. Conventionally, wear rings and oil seals are located, as will readily be understood by the skilled addressee, between the bushing 86 and the rotating locking sleeve 94. Towards an outer edge of the rotating locking sleeve 94, a pair of flanges 96 permit a timing belt to be connected to the locking sleeve to effect controlled rotation thereof. Of course, alternative drive mechanism may also be employed, as will be appreciated.

Typically, interface surfaces between the bushing 86 and the rotating locking sleeve 94 will include wear rings 97 and oil seals 99. Alternatively, these seals and wear rings may sit directly inside the bores of the platen. The location of seals and wear rings is simply a conventional design option and is merely driven by functional considerations readily appreciated by the skilled addressee.

The rotating locking sleeve 94 includes an internal surface containing bands of teeth 98 or notches that are shaped and arranged to engage positively against correspondingly shaped teeth 100 in an external surface of the tie bar 32. Clearly, in use, the tie bar passes through the rotating locking sleeve 94 and may be locked in a plurality of locations based merely on the appropriate alignment of teeth and subject to appropriate adjustment/positioning of the tie bar 32/moving platen to compensate for variable mold shut heights. In the disengaged position, channels (not shown) through the rows of teeth permit the tie bar 32 to be moved through the rotating locking sleeve 94. As can be seen in FIG. 2, a small clearance 102 can be seen to exist between the respective teeth of the tie bar and rotating locking sleeve 94. This clearance 102 is, conventionally, controlled by taking a moving platen position measurement (such as with a position transducer) and the use of a related processor that are associated with the locking mechanism 80. The clearance is necessary to ensure that that relative rotation of the locking sleeve 94 to the tie bar 32 can selectively occur smoothly and without any likelihood of friction, wear or restriction.

Figure 3:
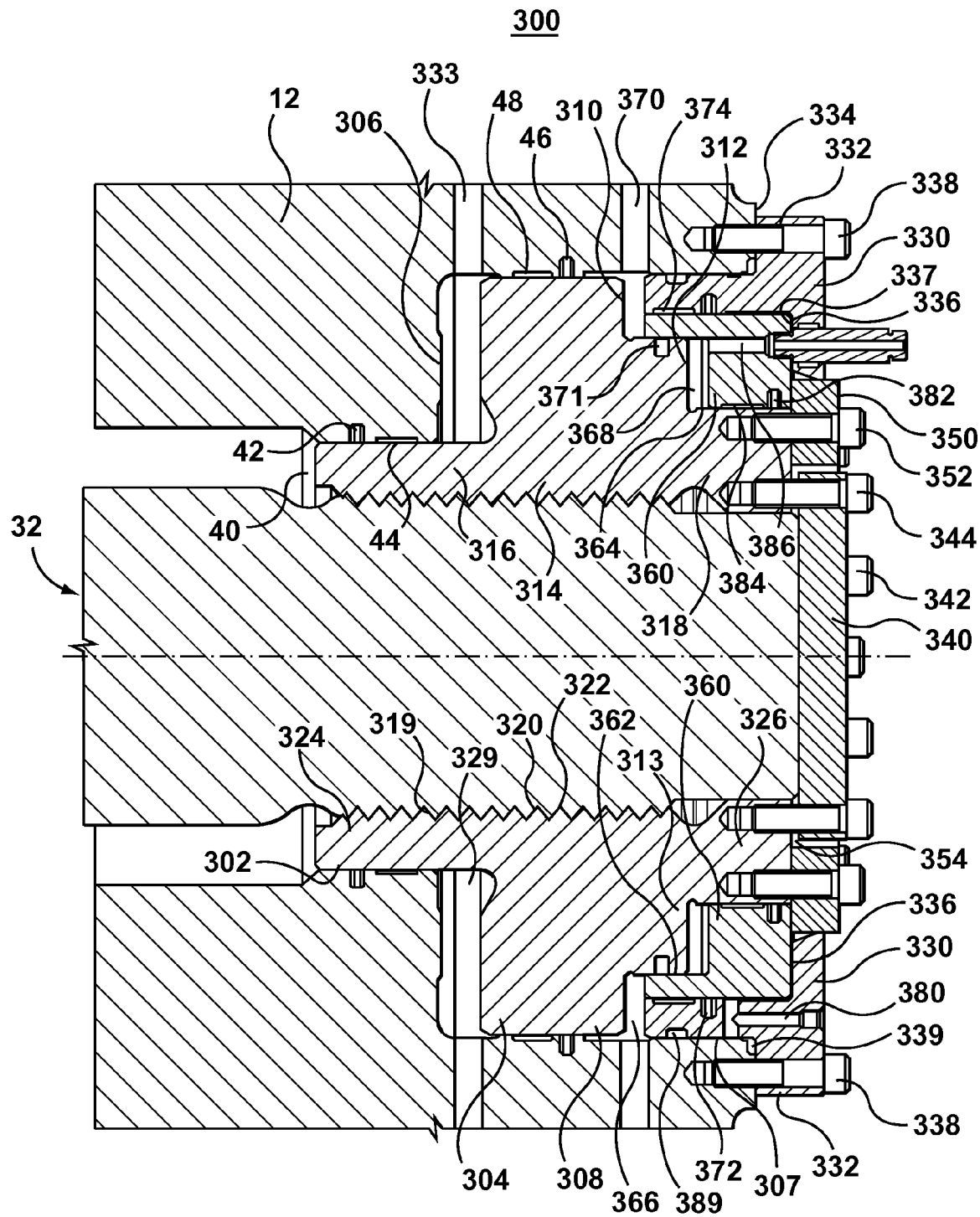
FIG. 3 is a clamp assembly according to a preferred embodiment of the present invention, the clamp assembly shown in a neutral (reset) position.

FIG. 3 shows a clamp assembly 300 according to a preferred embodiment of the present invention, the clamp assembly 300 specifically shown in a neutral position, i.e. in a position where a clearance 102 would exist between the respective sets of teeth in the locking assembly and tie bar of FIG. 2. It will therefore be understood that the clamp assembly 300 would usually be used in conjunction with a locking mechanism 80 substantially as described above and as shown in FIG. 2.

In terms of the structure of and within the stationary platen 20, FIG. 3 again shows that this includes a bore 302 into which is located a generally cylindrical clamp piston 304. The bore 302 includes a bore step 306 that varies the diameter of the bore 302 from a relatively wide diameter to a relatively small diameter. The bore step 306 is preferably a discrete and absolute transition, although it could be inclined or shaped in some other way. The clamp piston 302 includes a clamp piston head 308 that includes a first step 310 and a second step 312 in a front region 313 of the piston head. An outermost circumferential surface of the clamp piston head 308 seals against a region of the bore's wide diameter, the region being intermediate between the bore step 306 and an opening 307 into the bore in the face of the stationary platen 12.

The clamp piston 304 further includes an elongate body portion 314 integrally formed with the clamp piston head 308, the body portion 314 having longitudinally extending legs 316, 318 extending forward and aft of the clamp piston head 308. On an inner surface 319 of the body portion 314, a keyed (or threaded) area 320 is arranged positively to engage into a corresponding keyed (or threaded) surface 322 of a tie bar 32, whereby a resulting coupling of the tie bar 32 to the piston 304 permits force transmission therebetween. The inner surface 319 of the body portion 314 (and particularly inner leg 324 and outer leg 326) of the piston therefore extends along and are juxtaposed to an outer surface 328 of the tie bar 32 generally to surround an end region of the tie bar 32 within the stationary platen 12.

The clamp piston head 308 locates within the relatively wide diameter of the bore 302 to define, in combination with an outer surface of the inner leg 316 and the bore step 306, a clamp up chamber 329 for receipt, in use, of hydraulic fluid, such as oil. The clamp up chamber 329 is connected via a channel 333 to a pump that, typically, provides relatively high pressure (e.g. ~220 bar=22 megaPascals). The inner leg 316 extends into the relatively small diameter of the bore 302 such that the end of the inner leg 324 abuts and seals into a retainer 40 (as previously described). Between an external surface of the inner leg 324 and the relatively narrow region of the bore 302, pressure seals 42 and wear rings 44 may be located to provide sealing and to accommodate sliding movement of the piston 304 relative to the stationary platen 12. Similarly, pressure seals 46 and wear rings 48 are typically included between an outer surface of the clamp piston head 308 and the relatively wide region/diameter of the bore 302.

The piston 304 is principally held in place in the bore 302 by an essentially T-shaped piston front ring 330 in which a first shoulder 332 engages against an outer surface 334 of the stationary platen 12. The piston front ring may also be interchangeably referred to as a retaining ring. A central body portion of the piston front ring 330 extends into the bore 302 and thereby provides a form of bushing. A second shoulder 336 of the piston front ring 330 provides a hard stop or shoulder 337. The second shoulder 336 could, however, be realized by any suitable form of mechanical detent. The second shoulder 336 defines a zero (neutral) position for the clamp assembly; the reason for this will become apparent later. The piston front ring 330 is coupled to the stationary platen 12 typically with the use of bolts 338 that pass through the first shoulder 332. Along an interface between the piston front ring 330 (particularly its central body portion and the first shoulder 332) and the stationary platen (particularly the bore 302), the assembly preferably includes at least one oil seal 339.

A tie bar end plate 340 is coupled across the end of the tie bar 32 and is secured to the piston 304 by axially extending bolts 342 or the like. The tie bar end plate 340 is therewith pushed against the end of the tie bar 32 and pulls the piston to effect elimination of any clearance inside the threaded connection. Consequently, the piston 304, the tie bar 32 and the tie bar end plate 340 are mechanically coupled together and move as a single sub-assembly (when the tie bar 32 undergoes clamp up and mold break).

In a preferred configuration, a reset stop plate 350 is also coupled to the piston 304 with bolts 352 (or the like). The reset stop plate 350 is positioned next to an inner diameter of the piston front ring 330 and is also adjacent an edge of the tie bar end plate 340. The reset stop plate 350 therefore also moves with the clamp piston 304. The reset stop plate 350 also provides a definitive stop (reference point or shoulder 351) for outward movement of the reset piston 360.

In FIG. 3 it will be noted that a small gap 354 exists between the tie bar end plate 340 and the piston 304; this is a preferred design feature. Firstly, the gap provides preload to connect the bolt (thread) that connects the tie bar 32 to the piston 304, with this preload preventing relative movement between the piston 304 and the tie bar 32 during transition between clamp up and mold break. Additionally, the gap 354 provides a tolerance adjustment feature that compensates for the actual manufactured length of each tie bar 32 and the impact of this manufacturing tolerance in relation to the locking assembly in the moving platen.

In the embodiment of FIG. 3, a reset piston 360 locates within a cavity/void formed between the piston front ring 330, the reset stop plate 350 and the first and second steps of the piston 304. More particularly, the reset piston 360 is shaped to engage against first ledge 362 and second ledge 364 formed in the main (clamp) piston 304 by transition from the first step 310 and the second step 312, whereby a mold break chamber 366 and a reset chamber 368 are formed. A hydraulic line 370 provides a source and drain channel to the mold break chamber 366. The reset piston is able to move (slideably) independently of the main piston 304 and the piston front ring 330.

More particularly, in the embodiment of FIG. 3, the mold break chamber 366 is essentially defined by the first step 310, the first ledge 362 between the first step 310 and the second step 312 and end surfaces of the reset piston 360 and the piston front ring 330. An oil seal 371 is provided within the first ledge 362 to prevent leakage between the reset piston 360 and the main clamp piston 304. Similarly, a suitable seal 372 is also provided in the interface between the piston front ring 330 and the reset piston 360. A wear ring 374 is also typically provided in the interface between the piston front ring 330 and the reset piston 360. Behind the wear ring 374 and the seal 372, it is preferable that a drain channel 380 is used to remove any oil that escapes past the seals 372, 389.

In the embodiment of FIG. 3, the reset chamber 368 is essentially defined by the second step 312, the second ledge 364 extending laterally from the base of the second step 312 and the reset piston 360. A seal 382 is provided within the second ledge 364 to prevent leakage from the reset chamber 368. A wear ring 384 is also typically provided in the interface between the reset piston 360 and the outer leg 318 of the piston 304. Hydraulic fluid, such as oil, is provided to the reset chamber 368 through a bore 386 in which its flow path is subject to valve actuation under processor control. The reset chamber 368, from a practical perspective, is typically coupled to an accumulator that can provide varying pressures of between about 5 bar to 8 bar (0.5 MPa to 0.8 MPa), subject to necessity. An outside end of the reset piston 360 is able to engage/abut against both the shoulder 337 in the piston front ring 330 and the reference point provided by the reset stop plate 350.

Generally surfaces of the clamp piston 304 that define the various chambers, i.e. the reset chamber 368, the mold break chamber 366 and the clamp up chamber 329, are generally orthogonal to the axis of the tie bar 32 and substantially parallel to one another; these are however design options. Again, the clamp up assembly (particularly the inner leg 316) abuts against a seal/retainer, as described and shown in relation to retainer 40 in FIG. 1.

The operation of and interactions between the piston 304 and the reset chamber 368, the mold break chamber 366 and the clamp up chamber 329 will now be explained.

From a pressure perspective in the reset chamber 368, the mold break chamber 366 and the clamp up chamber 329, the preferred operational sequence is:

1. Tie Bar Lock:

The clamp up chamber 329 has minimal pressure (i.e. less than about 1 MPa) sufficient only to cause the reset piston 350 to be held into the shoulder 337 in the piston front ring 330. No mold break pressure is required, so fluid in the mold break chamber 336 is directed/emptied towards the related storage tank. The reset chamber 368 receives pressure (e.g. ~0.5 MPa) to ensure that the reset piston 360 stays engaged against the reset stop plate 350. In this sense, the reset piston 360 causes longitudinal alignment of the inner surface of the reset stop plate 350 with the shoulder 337.

2. Clamp-up.

The clamp up chamber 329 receives full/high pressure from the connected hydraulic pump, while both the reset chamber 368 and the mold break chamber 366 are permitted to drain (i.e. oil is sent to tank). Typically, pressures in the clamp up chamber 329 could be in the region of about two hundred and twenty bar (22 MPa). The positive pressure in the clamp up chamber 329 creates the mold clamping force and causes stretch of the tie bars 32 such that the clamp piston 304 moves towards the piston front ring 330 and forces the reset stop plate 350 to disengage from the reset piston 360. The reset piston is still held against the shoulder 337 (or detent) in the piston front ring 330.

3. Mold Decompression.

The clamp up chamber 329 is allowed to vent to tank, although part of the hydraulic fluid from the clamp up chamber 329 flows to the mold break chamber 366 and the reset chamber 368. The reset piston 360 is therefore still held against the shoulder 337 (or detent) in the piston front ring 330, while the reset stop plate 350 moves into contact with the reset piston 360. At the end of mold decompression, the reset piston 360 is again in the neutral position (seen in FIG. 4a).

4. Mold Break.

The clamp up chamber 329 is allowed to vent to tank, whereas the mold break chamber 366 receives, from the preferred hydraulic pump network, relatively high pressure (~22 MPa) through channel 370. The net effect is that the clamp piston 304 moves in the direction of the mold and reduces the volume of the clamp up chamber 329.

5. Tie Bar Unlock Before disengaging the locking sleeve 94, the tie bar 32 and piston assembly are now kept in place after mold break by closing valves to clamp up chamber 329 and mold break chamber 366.

6. Piston Position Reset The reset chamber 368 now receives full (relatively high) pressure, i.e. ~0.8 MPa. Minimal pressure (less than about 0.2 MPa) is now present in the clamp up chamber 329, whereas the mold break chamber 366 is still venting pressure to tank such that the entire piston assembly (namely elements 304, 350 and 360) is moved towards the piston front ring 330 until the reset piston 360 touches the shoulder 337.

FIG. 4 illustrates the operation of the clamp assembly of the present invention by showing a succession of physical states of the clamp assembly of FIG. 3 during an injection cycle. For the sake of clarity, various seals and bolts (shown in FIG. 3) have been omitted and particular areas of interest highlighted by encircling adjacent surface regions.

Figure 4A:
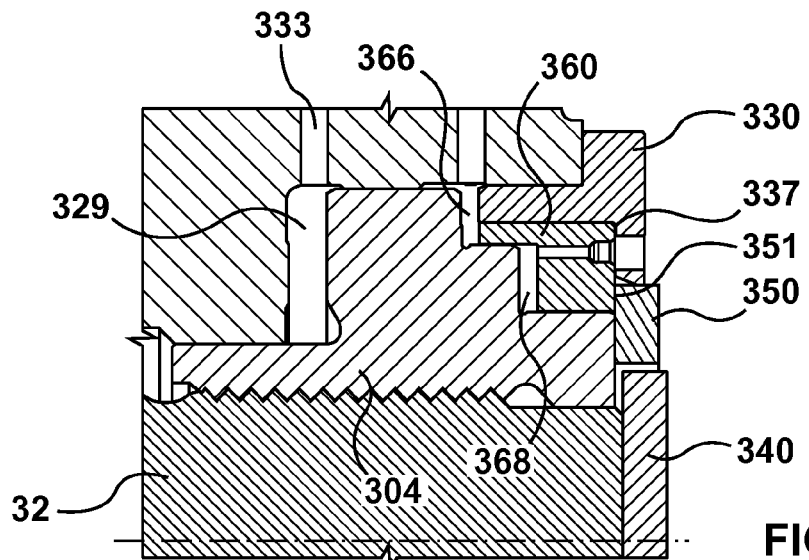
FIG. 4 shows a succession of states of the clamp assembly of FIG. 3 during an injection cycle.

In FIG. 4a (corresponding to FIG. 3), the clamp piston 304 is in a neutral/zero position in which clearance exists between the respective teeth on the tie bar 32 and the rotating locking sleeve 94. The reset piston 360 is engaged into the shoulder 337 of the piston front ring 330. The reset piston 360 is also engaged against the reset stop plate 350.

Figure 4B:
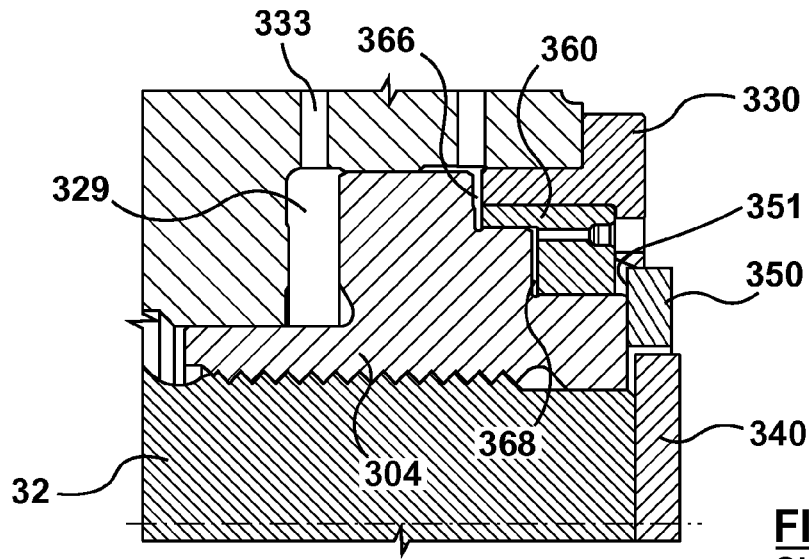

In FIG. 4b("clamp up"), the system is generating closure force in the mold. Movement of the clamp piston (and interconnected tie bar 32, reset stop plate 350 and tie bar end plate 340) causes the reset stop plate 360 to disengage/separate from the reset piston 360, whereas the independent moveable nature of the reset piston 360 results in the reset piston maintaining contact in the shoulder (hard stop) 337 of the piston front ring 330. The gap that is created between the reset stop plate 350 and the reset piston 360 fills with air taken from the ambient environment.

Figure 4C:
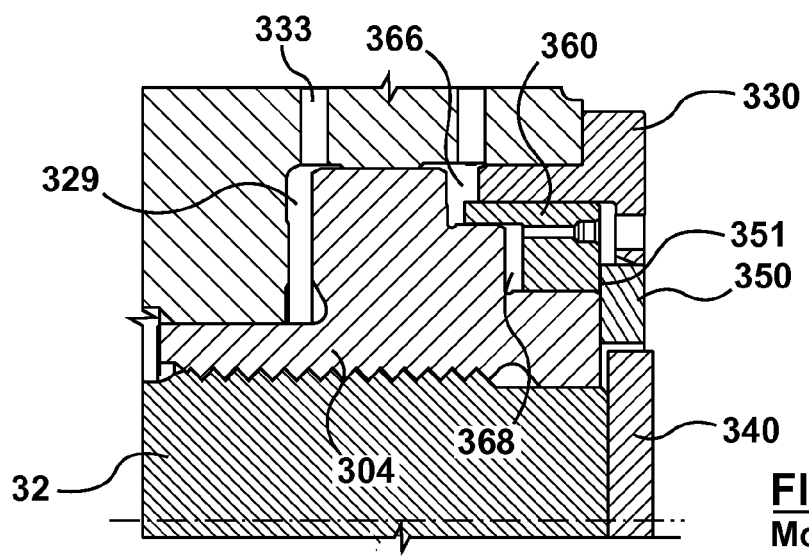

In FIG. 4c ("mold break"), pressure in the mold break chamber moves the clamp piston in the direction of the mold to open the mold and thus causes the reset piston 360 to disengage/separate from the shoulder (hard stop) 337 of the piston front ring 330. Specifically, with movement of the clamp piston 304, the reset stop plate 350 engages against the reset piston and pushes the reset piston in the direction of the mold. At this point, no position reference for the tie bar 32 relative to the rotating locking sleeve 94 exists, i.e. clearance between the respective sets of engagement teeth is unknown. Oil volume within the clamp up chamber 329 and mold break chamber 366 is fixed to maintain clamp piston and tie bar positions during unlock.

7. Clamp Piston Reset:

With limited pressure in the clamp chamber 329, the clamp piston 304 can move to engage the reset piston 360 and to push the reset piston back until the reset piston engages into the shoulder 337. So long as the force resulting from the pressure in the reset chamber 368 exceeds the force generated in the clamp-up chamber 329, the reset piston 360 resists further movement of the clamp piston 304 beyond the reference point and therefore ensures that the reset stop plate 350 does not disengage from the reset piston 360.

In other words, alignment and abutment of the adjacent faces of the reset piston with the piston front ring 330 and tie bar end plate 340 provides a datum (zero reference) that defines a position of the tie bar 32 that guarantees that clearance exists between teeth 100 on the tie bar 32 and teeth 98 on the rotating locking sleeve 94 (assuming that the locking sleeve 94 was positioned for a specific mold shut height).

Figure 5:
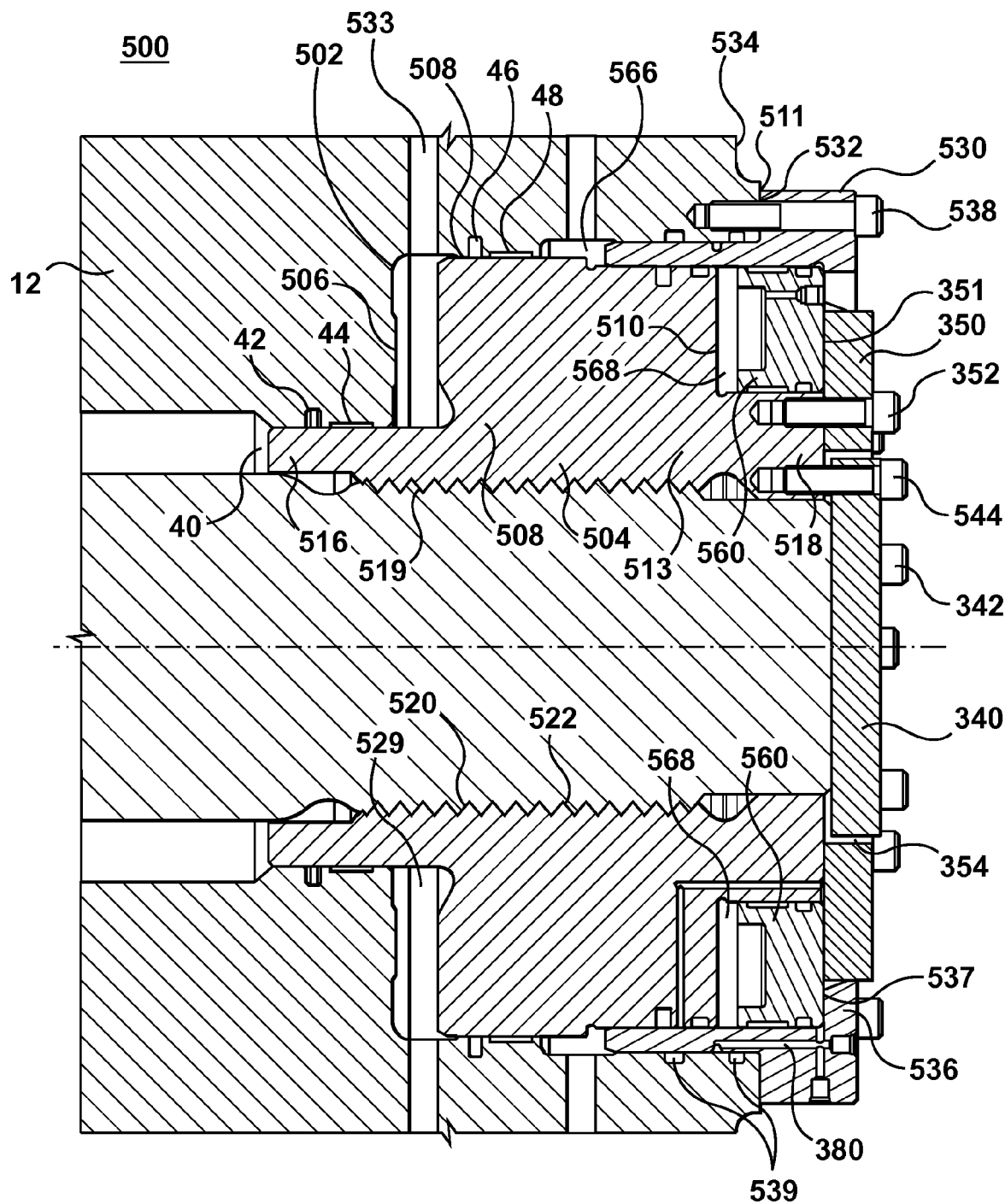
FIG. 5 is a clamp assembly according to an alternative embodiment of the present invention.

Referring to FIG. 5, there is shown an alternative embodiment of the present invention in which significant similarities exist (both in terms of structure and function) with FIGS. 3 and 4. In this alternative clamp piston assembly 500, the stationary platen includes a bore 502 into which is located a generally cylindrical clamp piston 504. The bore 502 includes a bore step 506 that varies the diameter of the bore 502 from a relatively wide diameter to a relatively small diameter. The bore step 506 is preferably a discrete transition, although it could be inclined or shaped. The clamp piston 504 includes a clamp piston head 508 that includes a first step 510 in a front region 513 of the piston head. An outer surface of the clamp piston head 508 seals against a region of the bore's wide diameter, the region being intermediate between the bore step 506 and an opening 511 into the bore in the face of the stationary platen 12.

The clamp piston 504 further includes an elongate body portion 514 integrally formed with the clamp piston head 508, the body portion 514 having longitudinally extending inner and outer legs 516, 518 extending forward and aft of the clamp piston head 508. On an inner surface 519 of the body portion 514, a keyed area 520 is arranged to positively engage into a corresponding keyed (or threaded) surface 522 of the tie bar 32, whereby a resulting coupling of the tie bar 32 to the piston 504 permits force transmission therebetween. The inner surface 519 of the body portion 514 (and particularly inner leg 524 and outer leg 526) of the piston therefore extends along and are juxtaposed to an outer surface of the tie bar 32 generally to surround an end region 528 of the tie bar 32 within the stationary platen 12.

The clamp piston head 508 locates within the relatively wide diameter of the bore 502 to define, in combination with an outer surface of the inner leg 516 and the bore step 506, a clamp up chamber 529 for receipt, in use, of hydraulic fluid, such as oil. The clamp up chamber 529 is connected via a channel 533 to a pump that, typically, provides relatively high pressure (e.g. up to about 220 bar=22 megaPascals). The inner leg 516 extends into the relatively small diameter of the bore 502 such that the end of the inner leg 524 abuts and seals into a retainer 40. Between an external surface of the inner leg 524 and the relatively narrow region of the bore 502, pressure seals 42 and wear rings 44 may be located to provide sealing and to accommodate sliding movement of the tie bar 32 relative to the stationary platen 12. Similarly, pressure seals 46 and wear rings 48 are typically included between an outer surface of the clamp piston head 508 and the relatively wide region/diameter of the bore 502.

The clamp piston 504 is principally held in place in the bore 302 by an essentially T-shaped piston front ring 530 in which a first shoulder 532 engages against an outer surface 534 of the stationary platen 12. The piston front ring 530 may also be interchangeably referred to as a retaining ring. A central body portion of the piston front ring 530 extends into the bore 502 and thereby provides a form of bushing. A second shoulder 536 of the piston front ring 530 provides a hard stop 537. The second shoulder 536 could, however, be realized by any suitable form of mechanical detent. The second shoulder 536 defines a zero (neutral) position for the clamp assembly. The piston front ring 530 is coupled to the stationary platen 12 typically with the use of bolts 538 that pass through the first shoulder 532. Along an interface between the piston front ring 530 (particularly its central body portion and the first shoulder 532) and the stationary platen (particularly the bore 502), the assembly preferably includes at least one oil seal 539.

A tie bar end plate 340 is coupled across the end of the tie bar 32 and is secured to the piston 504 by axially extending bolts 342 or the like. Consequently, the piston 504, the tie bar 32 and the tie bar end plate 340 are mechanically coupled together and move as a single sub-assembly (when, for example, the tie bar 32 undergoes clamp up and tie bar stretch).

A reset stop plate 350 is also coupled to the piston 504 with a bolt 352 (or the like). The reset stop plate 350 is positioned next to an inner diameter of the piston front ring 330 and is also adjacent an edge of the tie bar end plate 340. The reset stop plate 350 also moves with the clamp piston 504. The reset stop plate therefore provides a definitive stop for a reset piston 560.

In FIG. 5 it will be noted that a small gap 354 exists the tie bar end plate 340 and the piston 504; this is a preferred design feature. Firstly, the gap provides preload to connect the bolt (thread) that connects the tie bar 32 to the piston 504, with this preload preventing relative movement between the piston 504 and the tie bar 32 during transition between clamp up and mold break. Additionally, the gap 354 provides a tolerance adjustment feature that compensates for the actual manufactured length of each tie bar 32 and the impact of this manufacturing tolerance in relation to the locking assembly in the moving platen.

In the embodiment of FIG. 5, a mold break chamber 566 is defined between an outer surface of the piston head 508, the bore 502 and an end surface of the body portion of the piston front ring 530. A hydraulic line 370 provides a source and sink for high pressure fluid (e.g. oil at up to about 22 MPa), as previously described.

In the embodiment of FIG. 5, an air-actuated reset piston 560 locates within a void formed between the piston front ring 530, the reset stop plate 350 and the first step 510. In an identical clamp piston 504 and the piston front ring 530. Sliding surfaces between the reset piston 560 and both the body of the piston front ring 530 and the outer leg 518 of the piston include wear rings and seals. Behind the wear ring and the seal, it is preferable that a drain channel 380 is located to separate oil from air in the two adjacent chambers. The reset piston 560 thus defines a reset chamber 568 as the variable volume between the reset piston 560 and the first step 510.

Indeed, as necessary and as will now be understood, suitable seals and wear rings will be positioned between all the various elements of the clamp assembly. Typical sealing positions and wear ring positions are illustratively shown in FIG. 5, with many of these locations corresponding to those described above in relation to FIG. 3.

In contrast to the embodiment of FIG. 3, pneumatically-generated pressure is used to actuate and control the position of the reset piston 560. The reset chamber 568, from a practical perspective, is typically filled with air at a pressure of about 5 bar (0.5 MPa) via a check valve (not shown) whose operation is to prevent air from escaping from reset chamber 368 during clamp up. The pressure then increases slightly as the volume of the reset chamber 368 is reduced.

An outside end of the reset piston 560 is able to engage/abut against both: i) the hard stop 537 in the piston front ring 330; and also ii) the reset stop plate 350. The operation of FIG. 5 is substantially as that described above in relation to FIG. 3 and FIG. 4. In summary, clamp-up pressures separates the reset stop plate 350 from the reset piston 560 and retains the reset piston 560 in contact with the second shoulder 536. From the neutral position and to effect mold break, the clamp piston 504 moves in an opposite direction and causes the reset stop plate 350 to disengage the reset piston 560 from the second shoulder 536. With reset, limited pressure in the clamp-up chamber 529 again moves the clamp piston outwardly to urge the reset piston 560 into contact with both the reset stop plate 350 and the piston front ring 530, while movement beyond this alignment is prevented by the reset chamber force exceeding the force in the clamp-up chamber 529.

The foregoing description of FIG. 5 therefore merely highlights the structural distinctions with FIG. 3, since the function, operation and effect achieved (namely establishing a reference position and achieving mold break) is otherwise identical.

Figure 6:
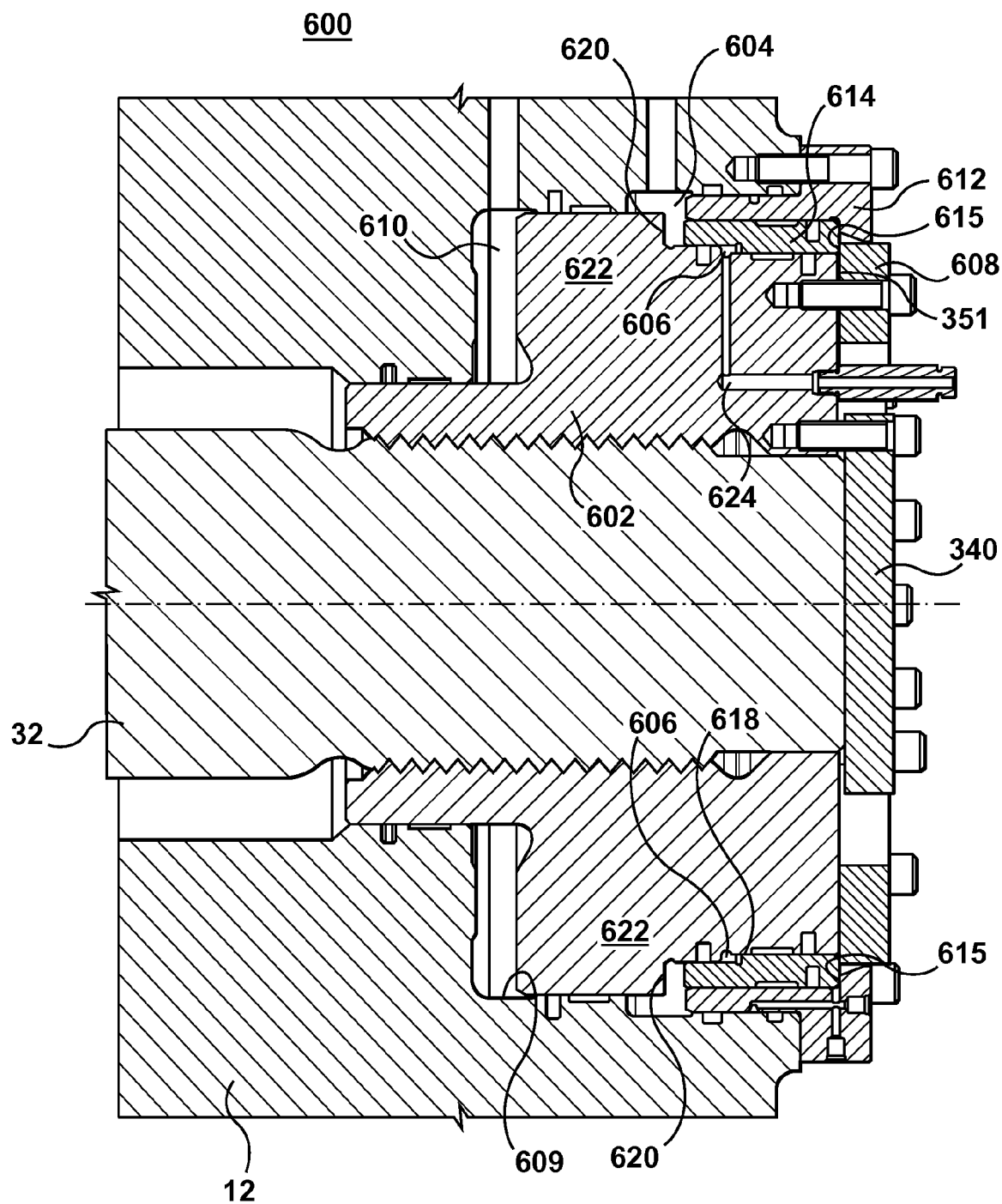
FIG. 6 is a clamp assembly according to a second alternative embodiment of the present invention.

FIG. 6 is a further embodiment of the present invention. Again, the clamp assembly 600 achieves the same reset (position reference) and mold break functions, although the structure of the piston 602, the location of a mold break chamber 604 and a reset chamber 606 and the configuration of the reset stop plate 608 are slightly different. However, in general, the same general bore 609 and clamp piston configuration is present. And the tie bar end plate 340 is again coupled to the piston 602 and the tie bar 32. Also, there are the usual seals and wear plates between the various components and chambers. Equally, similarities in the channeling (to the clamp up chamber 610 and mold break chamber 604) through the stationary platen are present.

A piston front ring 612 is again of a generally T-shaped configuration. Consequently, the piston front ring 612 again contains two shoulders which either: i) engage and effective locking of the piston front ring 612 to the stationary platen; or ii) selectively/periodically engage against a rear surface of a independently movable reset piston 614. The reset chamber 606 is, in the embodiment of FIG. 6, defined between an inner edge of the reset piston 614 and a ledge 618 defined by a step 620 in a head region 622 of the piston 602. Like the other embodiments, the reset piston 614, on occasion (such as in FIG. 6), engages against the reset stop plate 608 that, again, is coupled to the piston 602. A pressurized fluid is selectively and controllably introduced in the clamp up chamber 610, the mold break chamber 604 and the reset chamber 606. Routing of pressure supply and drain channels is merely determined by available rear estate in the piston and is shown, in FIG. 6, to again enter through a suitable valve.

Essentially, FIG. 6 provides a very high pressure mold break and reset function, since the mold break chamber 604 and reset chamber 606 have relatively small active areas and the reset piston is comparatively relatively narrow. Indeed, part of the reset chamber could be defined by a supply/drain channel 624 that is drilled (or otherwise formed) within the clamp piston 602. In relation to the hydraulic pressures generated in the reset piston, these are relatively high (~5 MPa) compared to the embodiment of FIG. 3 (~0.5 MPa). Again, an accumulator is used to provide tanking and supply of hydraulic fluid (or the like) to the reset piston 614.

Sliding and sealing surfaces between the various chamber and components contain seals and wear rings, as will be understood and as typically shown in FIG. 6. In this regard, interpretation of the various elements in FIG. 6 is assisted by referring to FIGS. 3 and 5 and the accompanying description that provides considerable and appropriate detail.

The operation of FIG. 6 is exactly as that described above in relation to FIG. 3 and FIG. 4, i.e. the same relative surface movements and periodic contacts occur between: i) the reset piston 614; ii) the reset stop plate 608 (and thus the connected tie-bar end plate 32); and the piston front ring 612. The net effect is therefore to a clamp unit that provides mold break and precise positioning of the tie-bar for tooth clearance purposes. Again, in summary, clamp-up pressures separates the reset stop plate 608 from the reset piston 614, while retaining the reset piston 614 in contact in the reference detent 615 in the piston front ring 612. With mold break, the clamp piston 602 moves in an opposite direction and causes the reset stop plate 608 to "pick up" the reset piston 614 and to disengage the reset piston 614 from the detent 615. With reset, limited pressure in the clamp-up chamber 610 again moves the clamp piston outwardly to urge the reset piston 614 into contact with both the reset stop plate 608 and the piston front ring 612, while movement beyond this alignment is prevented by the reset chamber force exceeding the force in the clamp-up chamber 610.

Figure 7:
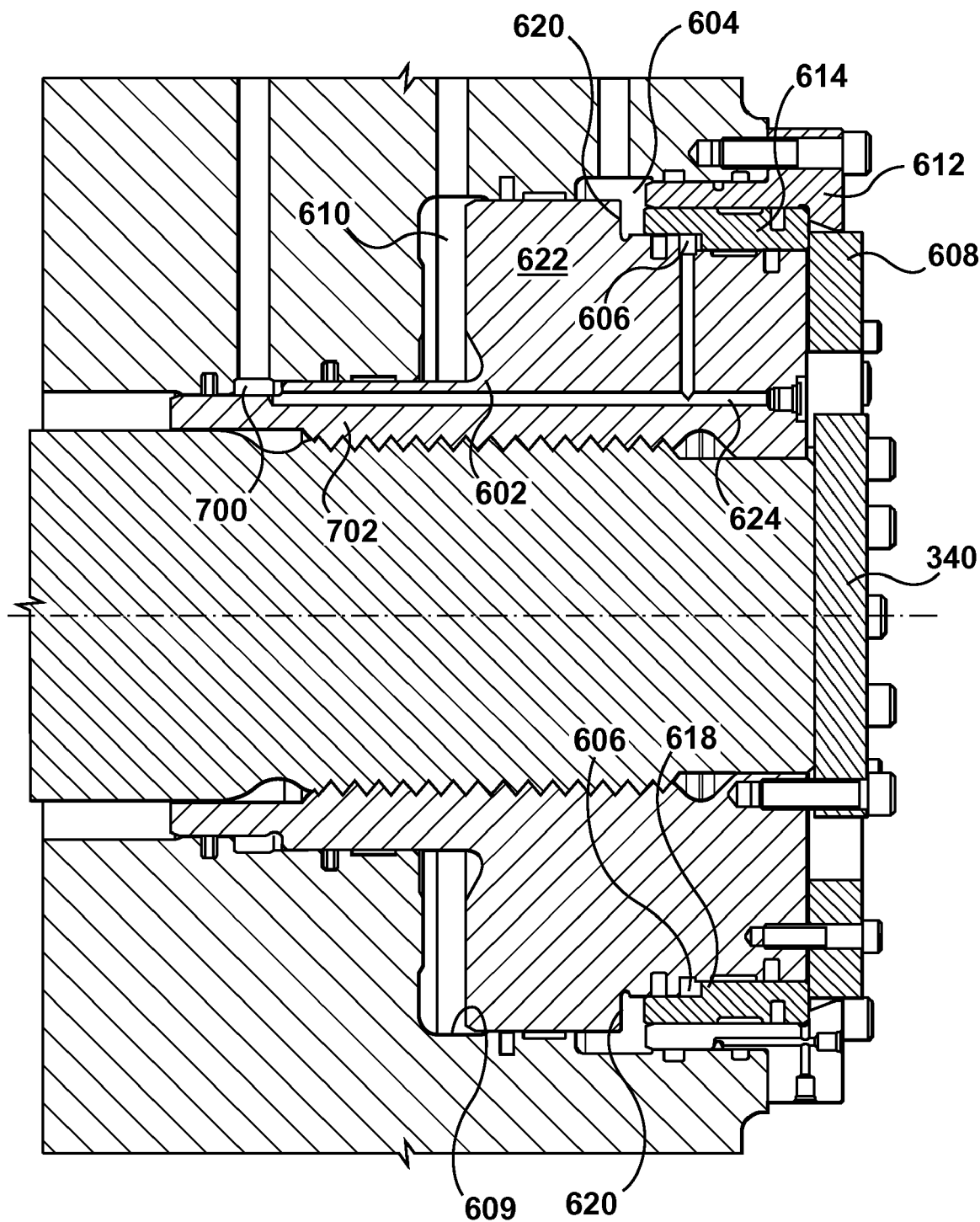
FIG. 7 is a clamp assembly according to a third alternative embodiment of the present invention.

FIG. 7 is yet another embodiment of a clamp assembly. In fact, FIG. 7 is a further refinement of the architecture of FIG. 6. Specifically, a secondary reset chamber 700 is formed between an inner leg 702 of the piston and the bore 609. The secondary reset chamber is in fluid communication with the (primary) reset chamber 606 by extending the network of the of supply/drain channel 624. The secondary reset chamber 700 is coupled to an accumulator through a bore 704, with the accumulator providing oil to the primary reset chamber 606 via the secondary reset chamber 700. When the clamp piston 602 moves, the relative volumes of the primary 606 and secondary 700 reset chambers are altered. In this way, less hydraulic fluid is moved to the accumulator during reset, since hydraulic fluid is moved between the primary 606 and secondary 700 reset chambers on a period basis. The use of relatively high pressure from the accumulator (preferably about 5 MPa) has the added benefit that pressure control in the clamp up chamber is rendered redundant since pressure in the secondary reset chamber 700 has the effective of moving the piston 602 into contact with the reset stop plate 608 and resisting excessive movement of the clamp piston (in the reset phase) that would otherwise disengage the reset piston from the reset stop plate. As previously described in relation to FIG. 6 and other embodiments, the same relative surface movements and periodic contacts thus occur between: i) the reset piston 614; ii) the reset stop plate 608 (and thus the connected tie-bar end plate 32); and the piston front ring 612.

Figure 8:
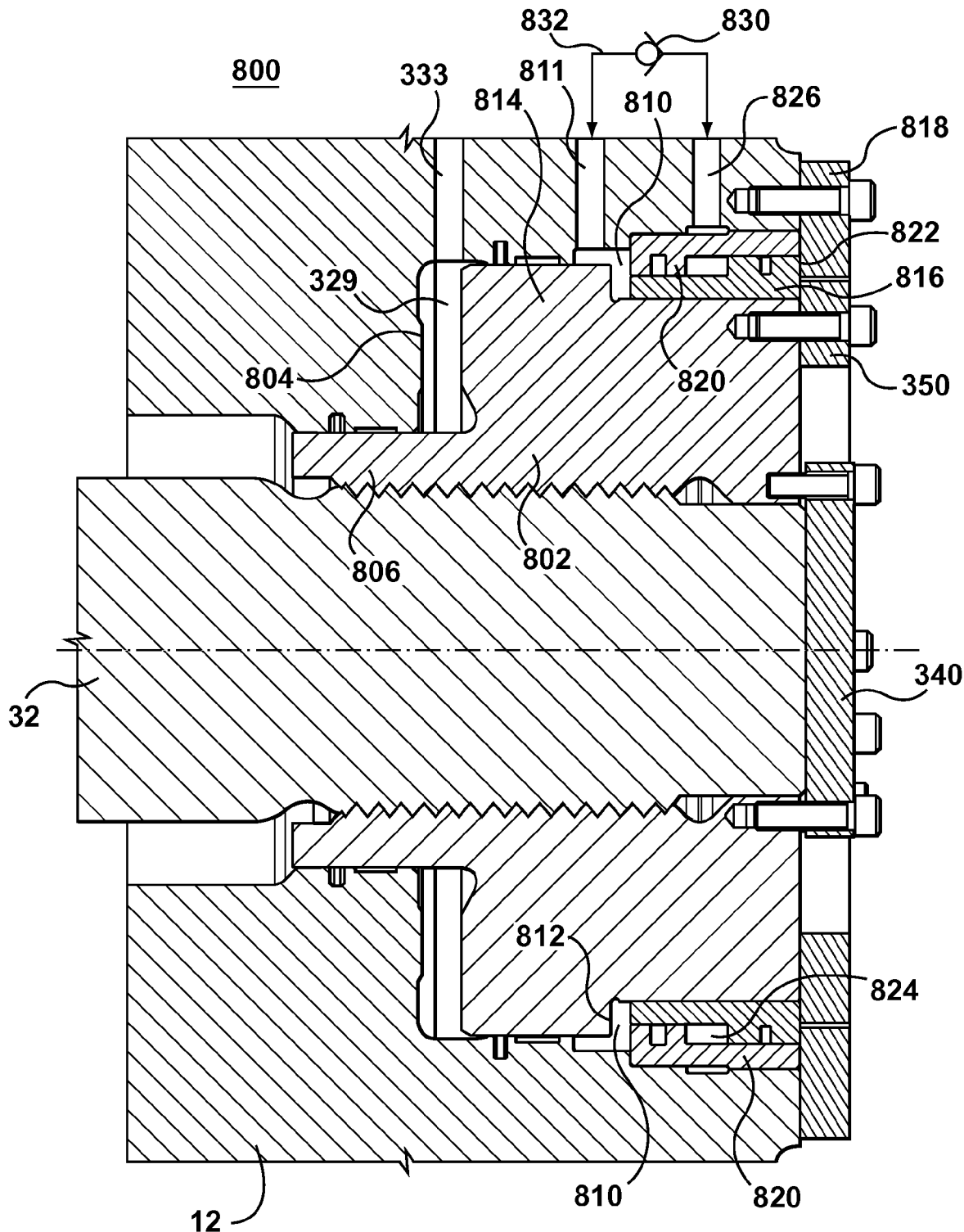
FIG. 8 is a clamp assembly according to a fourth alternative embodiment of the present invention.

Turning to FIG. 8, yet another embodiment of a clamp assembly 800 is shown. In this configuration, the clamp piston 802 again contains both a bore step 804 that, in combination with an inner leg 806 and a bore 809 within the platen 12, defines a clamp up chamber 329. The clamp up chamber 329 receives pressurizing fluid from a pump (or the like) via a conduit or channel 333. As usual, a mold break chamber 810 is essentially defined by a transition step 812 in the piston's head, with the mold break chamber 810 further defined by the bore 810 and an end surface of an independently moveable reset piston 816. Conventionally, the mold break chamber 810 receives pressurizing fluid from a pump (or the like) via a conduit or channel 811. In this respect, substantial similarities exist with the other embodiments, e.g. FIG. 3, so the following explanation will concentrate on the structural differences only.

Unlike the prior embodiments, the clamp assembly 800 of FIG. 8 has a simplified piston front ring 818 that is essentially only a retaining plate 350 which, together with an adjacently located reset stop plate 350 (as previously described), defines a cavity in which is located the reset piston 816 and a piston plate 820 (which essentially is a tube). The piston front ring 818 is again secured to the platen 12.

On one side, the piston plate 820 is engaged against the piston front ring 818, whereas on its opposite side the piston plate 820 is coupled against a ledge in the bore 804 and is thus secured in place within the cavity. The reset piston 816 is still arranged to engage selectively against one or both of an inside shoulder (or hard stop) 822 of the piston front ring 818 and/or an inside surface of the retaining plate 350. When in contact with one another, the reset piston 816 and the piston plate 820 define an internal reset chamber 824 whose volume changes based on the movement of the reset piston 816 relative to the piston plate 820. A conduit or channel 826 through the platen 12 is arranged to provide suitable fluid (e.g. hydraulic oil) to the reset chamber 824 to actuate the reset piston 816 on an as required basis.

In the clamp assembly 800, a check valve 830 is located in a connecting fluid flow path 832 between the mold break chamber 810 and the reset chamber 824.

Sliding and sealing surfaces between the various chamber and components in the clamp assembly 800 (including surfaces between the reset piston 816 and the piston plate 820) contain seals and wear rings, as will now be readily understood and appreciated.

Again, like the other embodiments, the operation of the clamp assembly 800 of FIG. 8 is substantially as that described above in relation (for example) to FIG. 3 and FIG. 4, i.e. the same relative surface movements and periodic contacts occur between: i) the reset piston 816; ii) the reset stop plate 350 (and thus the connected tie-bar end plate 32); and the piston front ring 818. The net effect is therefore to a clamp unit that provides mold break and precise positioning of the tie-bar for tooth clearance purposes.

The effect of the internal reset chamber 824 and the check valve 830 will now be described. The purpose of the check valve 830 is to provide a selective fluid coupling between the reset and mold break chambers during the mold break function only. By providing this connection, fluid pressures in mold break chamber 810 and reset chamber 824 have the effect of establishing the zero (reference) position of the tie bar against both the reset stop plate 350 and the shoulder 822 on the piston front ring 818. Additionally, this selective fluid communication and pressure avoids having to use minimal pressure in the clamp up chamber 329 to attain the zero position where tooth clearance is guaranteed; this is similar to the principle described in relation to FIG. 7. In other words, during reset, hydraulic fluid passing the check valve creates pressure in the mold break chamber 810 and the reset chamber 824 and pushes the reset piston 816 back against the reset stop plate 350, while the reset piston 816 is also forced into contact with the piston front ring 818. Conversely, at mold break, pressure in the mold break chamber 810 only moves the clamp piston 802 away from the piston front ring 818 and thus separates the reset piston 816 from the shoulder 822 in the piston front ring 818 while maintaining contact between the reset piston 816 and the reset stop plate 350. In other respects, the pressurization of the various chambers is consistent fashion with the embodiments of FIGS. 3 to 7 and therefore follows that process expressly detailed above in relation to FIGS. 3 and 4.

In all cases, the effect of the inclusion of the reset chamber 368 is to provide a mechanically-controlled assembly that functions to separate the teeth in the rotating locking sleeve 94 relative to the teeth on the exterior of the tie bar 32. The function of the reset chamber 368 thereby establishes a suitable clearance, i.e. a zero or neutral position, for the tie bar 32 and particularly the teeth 100 of the tie bar. The effect of inclusion of the mold break chamber 366 obviates the need for a position transducer and thus reduces cost while also saving on clamp up time. Additionally, with mold break and reset chambers provided in the clamp piston, the present invention can generate higher forces than a simple spring-based system and, furthermore, the molding machine can benefit from smaller stroke cylinders operational merely to separate and bring together the stationary and moving platens. With smaller stroke cylinders, the system becomes more energy efficient and cheaper.

It will, of course, be appreciated that the above description has been given by way of example only and that modifications in detail may be made within the scope of the present invention. For example, the clamp unit finds generally applicability within any press type arrangement, including thixomolding applications, where mold break (or equivalent resistance to platen separation) is an issue. Similarly, the exact location of seals and wear plates is application specific and their placement/function will be well understood by the skilled addressee. Similarly, the size and exact location of oil or air chambers is embodiment specific, since it is the principle of providing a reset function associated with, but independent from, the structure of the piston assembly that is of higher importance. In this respect, the size and location (to some extent) of the various clamp up, mold break and reset chambers is also subject to alteration and is dependent on the various configurations of the bore, piston and retaining ring. In this regard, the number of steps in the piston head is not deterministic nor critical to the present invention. Rather, it is necessary that the pistons simply define a reset chamber, a clamp up chamber and a mold-break chamber to provide a known reference point for locking and a system for mold break.

The location of the clamp assembly within the stationary platen is merely exemplary and, if desired, it could conceivably be located within a different platen. Also, the application of the underlying technology is not limited to machines of a particular clamp force, but rather finds general application in small, medium and large tonnage molding machines or other equipment using presses (as will be readily appreciated).

The invention claimed is:

1. A self-positioning clamp assembly comprising:
a clamp up chamber arranged to effect, in use, movement of a clamp piston in a first axial direction;
a mold break chamber arranged to effect movement of the clamp piston in a second axial direction opposite to the first axial direction; and
a position reset chamber in which a reset piston is operative and independently moveable from the clamp piston;
a first reference shoulder against which the reset piston is selectively both engageable and separable; and
a second reference shoulder being moveable relative to the first reference shoulder and against which the second reference shoulder the reset piston is selectively both engageable and separable;
wherein an axial reference position for the self-positioning clamp assembly occurs with simultaneous engagement of the reset piston against both the first reference shoulder and the second reference shoulder.

2. The self-positioning clamp assembly according to claim 1, further comprising a reset stop plate coupled to the clamp piston, the reset stop plate realizing the second reference shoulder.

3. The self positioning clamp assembly according to claim 2, further comprising a tie bar end plate adjacent the reset stop plate, the tie bar end plate coupled to the clamp piston.

4. The self-positioning clamp assembly according to claim 1, further comprising an essentially T-shaped piston front ring, the essentially T-shaped piston front ring defining the first reference shoulder and having a further shoulder arranged to engage, in use, against an outer surface of a platen, a body portion of the essentially T-shaped piston front ring realizing a bushing for the self-positioning clamp assembly and a surface against which the reset piston axially slides.

5. The self positioning clamp assembly according to claim 4, wherein the essentially T-shaped piston front ring comprises a plate and a separate and orthogonally orientated piston plate.

6. The self-positioning clamp assembly according to claim 5, wherein the position reset chamber is defined internally between the reset piston and the piston plate, wherein a volume of the position reset chamber changes based on movement of the reset piston relative to the piston plate.

7. The self-positioning clamp assembly according to claim 6, further comprising a check valve coupled between the position reset chamber and the mold break chamber, the check valve arranged to provide selective fluid communication between the position reset chamber and the mold break chamber such that a first force within the position reset chamber periodically exceeds a second force within the mold break chamber.

8. The self-positioning clamp assembly according to claim 1, further comprising:
a secondary reset chamber in fluid communication with the position reset chamber.

9. The self-positioning clamp assembly according to claim 1, wherein the clamp piston includes a first step and a second step that respectively define first and second ledges in the clamp piston, the reset piston being configured to engage into the first and second ledges to define the mold break chamber and the position reset chamber.

10. A platen having a plurality of bores in each of which is located a self-positioning clamp assembly comprising:
a clamp up chamber arranged to effect, in use, movement of a clamp piston in a first axial direction;

a mold break chamber arranged to effect movement of the clamp piston in a second axial direction opposite to the first axial direction;

a position reset chamber in which a reset piston is operative and independently moveable from the clamp piston;

a first reference shoulder against which the reset piston is selectively both engageable and separable; and a second reference shoulder being moveable relative to the first reference shoulder against which the reset piston is selectively both engageable and separable;

wherein an axial reference position for the self-positioning clamp assembly occurs with simultaneous engagement of the reset piston against both the first reference shoulder and the second reference shoulder.

11. The platen according to claim 10, wherein the self-positioning clamp assembly further comprises a reset stop plate coupled to the clamp piston, the reset stop plate realizing the second reference shoulder.

12. The platen according to claim 11, wherein the self-positioning clamp assembly further comprises a tie bar end plate adjacent the reset stop plate, the tie bar end plate coupled to the clamp piston.

13. The platen according to claim 10, wherein the self-positioning clamp assembly further comprises an essentially T-shaped piston front ring, the essentially T-shaped piston front ring defining the first reference shoulder and having a further shoulder engaged against an outer surface of the platen, a body portion of the essentially T-shaped piston front ring realizing a bushing for the self-positioning clamp assembly and a surface against which the reset piston axially slides.

14. The platen according to claim 13, wherein the essentially T-shaped piston front ring comprises a plate and a separate and orthogonally orientated piston plate.

15. The platen according to claim 14, wherein the position reset chamber is defined internally between the reset piston and the piston plate, wherein a volume of the position reset chamber changes based on movement of the reset piston relative to the piston plate.

16. The platen according to claim 10, wherein the self-positioning clamp assembly further comprises a check valve coupled between the position reset chamber and the mold break chamber, the check valve arranged to provide selective fluid communication between the position reset chamber and the mold break chamber such that a first force within the position reset chamber periodically exceeds a second force within the mold break chamber.

17. The platen according to claim 10, wherein the self-positioning clamp assembly further comprises a secondary reset chamber in fluid communication with the position reset chamber.

18. The platen according to claim 11, wherein the clamp piston includes a first step and a second step that respectively define first and second ledges in the clamp piston, the reset piston being configured to engage into the first and second ledges to define the mold break chamber and the position reset chamber.

* * * * *